June 3, 1941.  E. F. WHEELER  2,244,092
AUTOMATIC PRESELECTOR MEANS TO SHIFT GEARS
Filed April 10, 1939  5 Sheets-Sheet 1
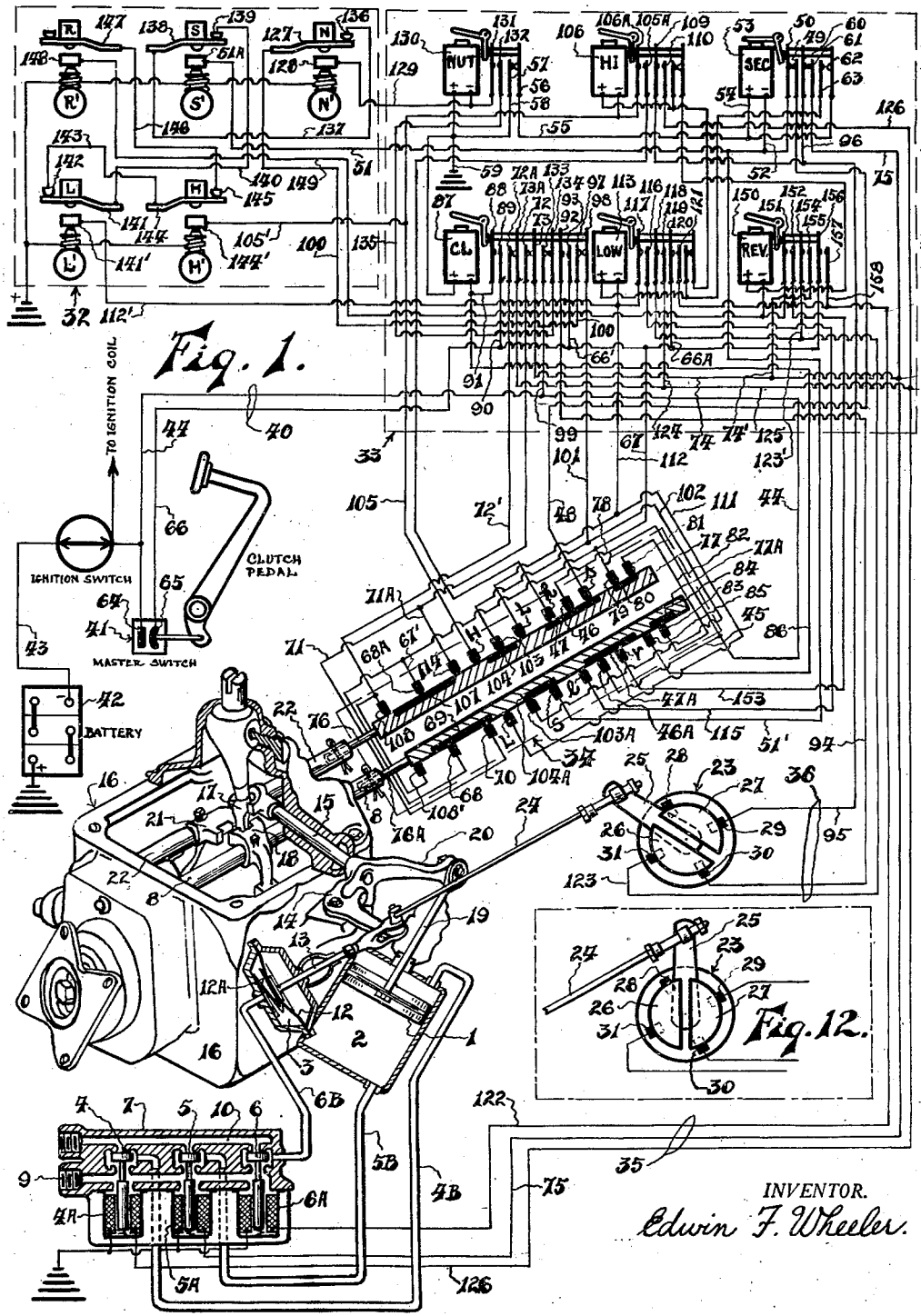
INVENTOR.
Edwin F. Wheeler June 3, 1941.  E. F. WHEELER  2,244,092
AUTOMATIC PRESELECTOR MEANS TO SHIFT GEARS
Filed April 10, 1939   5 Sheets-Sheet 3

INVENTOR.
Edwin F. Wheeler.

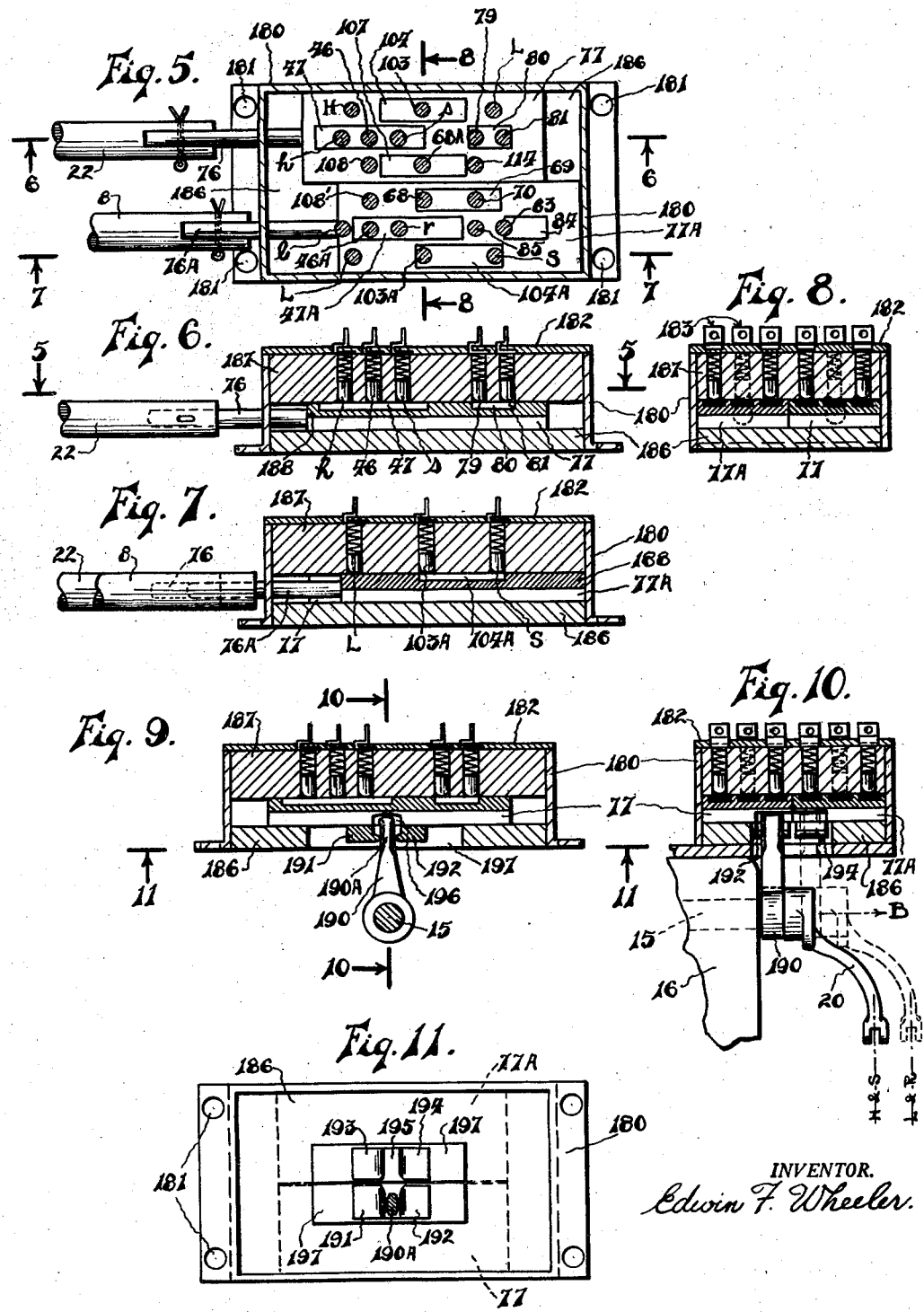

June 3, 1941.　　　E. F. WHEELER　　　2,244,092
AUTOMATIC PRESELECTOR MEANS TO SHIFT GEARS
Filed April 10, 1939　　　5 Sheets-Sheet 5
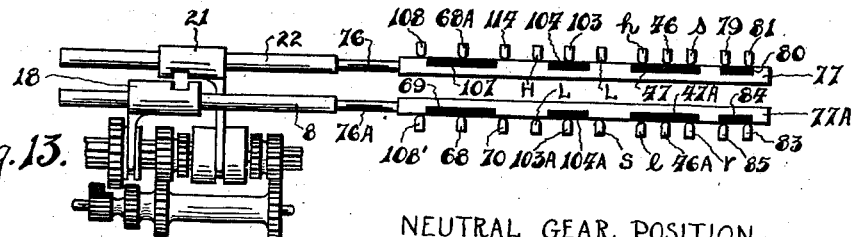
NEUTRAL GEAR POSITION.
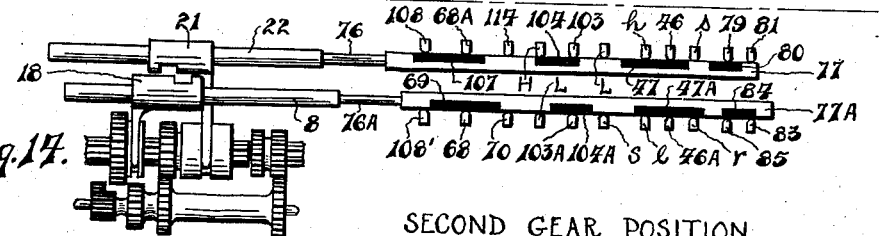
SECOND GEAR POSITION.
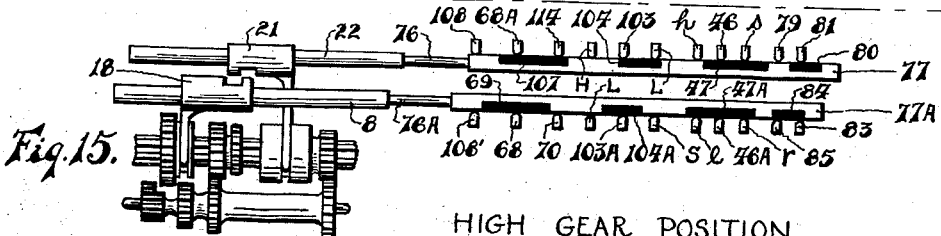
HIGH GEAR POSITION.
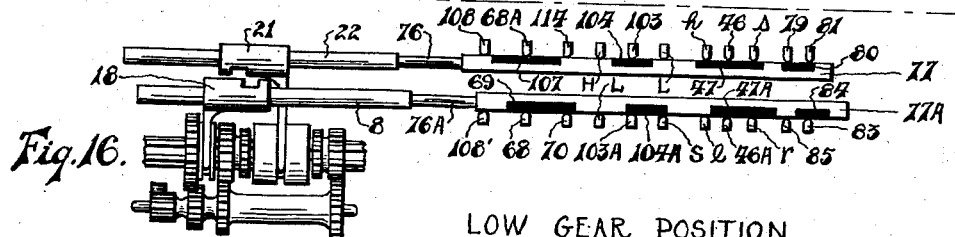
LOW GEAR POSITION.
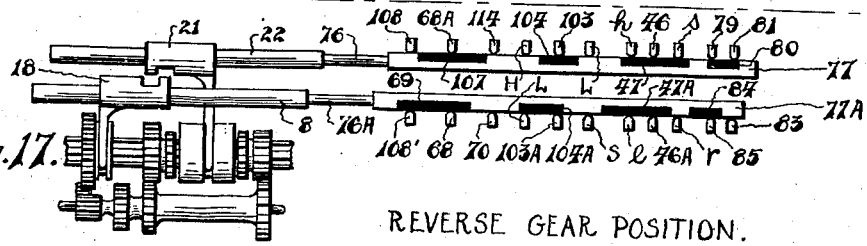
REVERSE GEAR POSITION.
INVENTOR.
Edwin F. Wheeler.

Patented June 3, 1941

2,244,092

UNITED STATES PATENT OFFICE 2,244,092

AUTOMATIC PRESELECTOR MEANS TO SHIFT GEARS

Edwin Frederick Wheeler, Baltimore, Md., assignor of one-half to Charles C. Sanford, Baltimore, Md.

Application April 10, 1939, Serial No. 267,190

18 Claims. (Cl. 192—3.5)

This invention relates to automatic preselector control means adapted to electrically shift gears automatically in an automobile or equivalent transmission, and is especially designed to apply as an improvement to transmission utilizing the vacuum of the intake manifold as the power means to shift the gears.

A particular object is to provide a novel mechanism or construction wherein following the pressing of a single button or the equivalent, means operate automatically to place the various gears in their usual sequential positions, that is progressively from low, to second, to high speed positions, thence to low, etc. each gear position taking place automatically when the engine clutch pedal is fully depressed.

A further object is to provide a construction wherein the said button pressing actuation need be but momentary, to avoid the necessity of holding any electrical or other part until a shift of a gear or gears is made.

A further object is to provide a novel mechanism which in addition to the above objects, will be selective, by the momentary pressing of any gear shift control button, thence will automatically revert to progressively sequential control.

It is further aimed to provide a novel construction wherein parts which operate to control two shifts can be actuated at the same time, without interfering one with another.

It is further aimed to provide a novel construction coacting with a master switch under control of the clutch pedal, the actuation of which must be accomplished prior to each separate gear shift.

Still another object is to provide a novel control means to shift gears in a transmission progressively sequential or selectively, and always indicate, by pilot light means constructed within the control buttons, the preselected gear shift position.

A still further object is to provide a novel automatic progressively sequential control means coacting with a master switch under control of the clutch pedal, the actuation of which must be accomplished prior to each separate gear shift, but upon continuous actuation having means to prevent a continuous shifting of gear positions progressively sequential.

Various additional objects and advantages will become apparent from a consideration of the description following taken in connection with accompanying drawings illustrating an operative embodiment.

In said drawings:

Figure 1 is an electrical diagram showing a vacuum actuated transmission, with electrical control valves, to which this invention has been applied and shown in its various parts.

Figure 5 is a sectional view taken substantially on the line 5—5 of Figure 6, of the transmission shift rod sequential control unit of the present invention, omitting part in section to more clearly illustrate relative positions of contact plates and terminals.

Figure 6 is a longitudinal sectional view of the sequential control unit, taken substantially along the line 6—6 of Figure 5, but showing sectionally the entire unit.

Figure 7 is a longitudinal sectional view similar to Figure 6, but taken along the line 7—7 of Figure 5.

Figure 8 is a cross-sectional view of the sequential control unit, taken along the line 8—8 of Figure 5.

Figure 9 is a longitudinal sectional view of the alternate sequential control unit, similar to Figure 6, but shown actuated by the vacuum cylinder shaft, instead of the gear shift rods as shown in Figure 6, and with contact blocks in neutral position.

Figure 10 is a cross sectional view taken substantially along line 10—10 of Figure 9, showing in addition part of the transmission case, vacuum cylinder shaft and its associated lever.

Figure 11 is a plan view of the bottom of the alternate sequential control unit, taken along the line 11—11 of Figure 9.

Figure 12 is a diagrammatic view of the interlocking switch in position opposite to that shown in Figure 1.

Figure 1A:
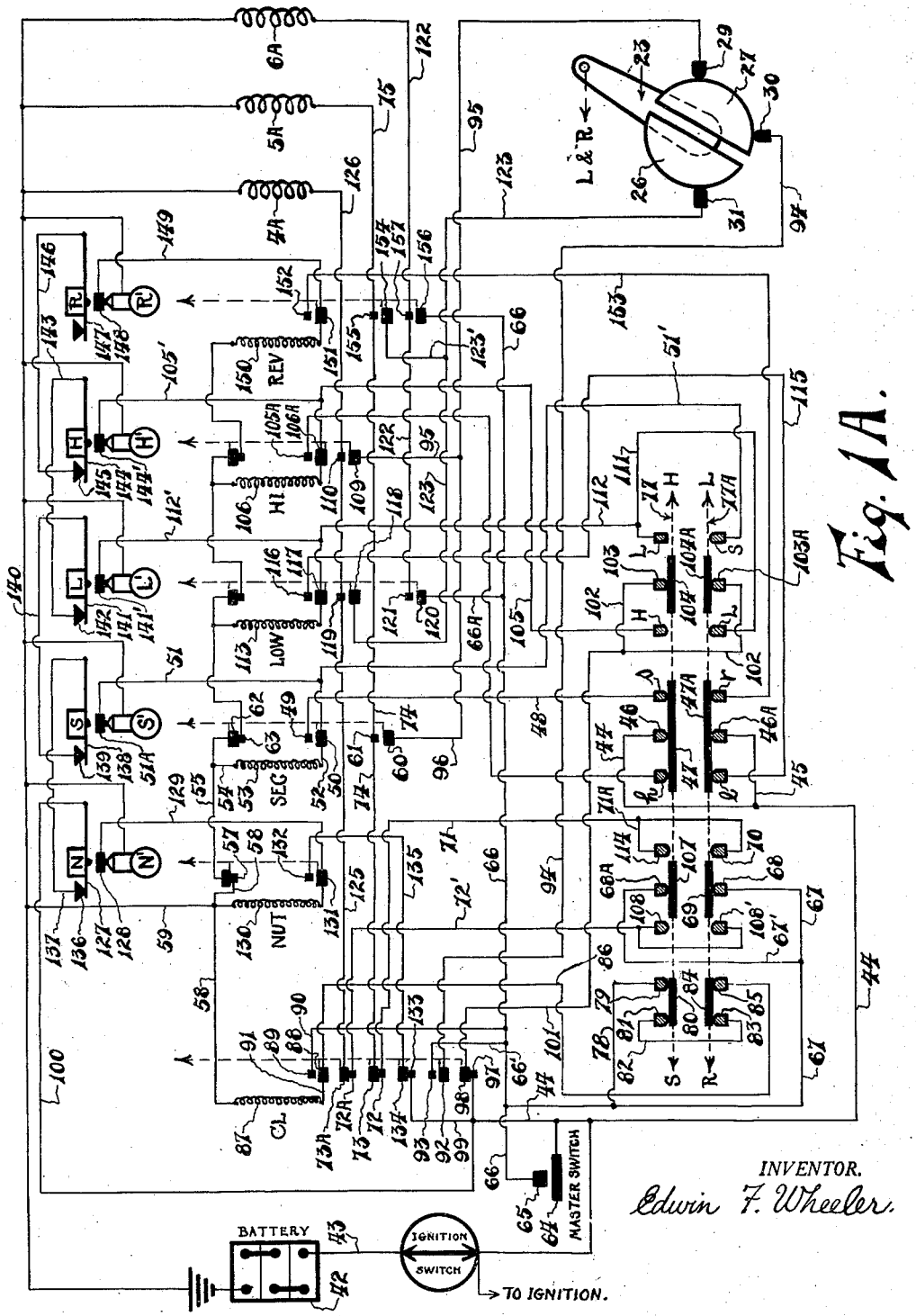
Figure 1A is a schematic wiring diagram similar to Figure 1, with its various parts and wires similarly numbered.

Figures 13 to 17 inclusive are shown to illustrate the relative positions of the contact blocks and associated terminals of the sequential control unit, in the various gear positions of the transmission.

Systems utilizing the vacuum of the intake manifold for shifting the gears of a motor vehicle have already been put into practical use. Such systems are highly efficient and as rapid in action as is possible by manipulation of the H-shaped control unit and clutch pedal, by the motor vehicle driver.

However, this control means is but a slight improvement over the old ball-shift hand lever formerly used to control the shifting of a motor vehicle transmission, as it is still necessary to preselect each separate shift of the transmission even though less energy is used in doing so.

This last mentioned type transmission employs three solenoid operated valves which control the movements of the shifting piston 1 (Figure 1) in the vacuum cylinder 2, and the cross shifting piston 12 in the diaphragm cylinder 3. These valves 4, 5, and 6 we enclosed in a case 7 and are actuated by the solenoids 4A, 5A, and 6A respectively. By preselection on an H-shaped control switch (not shown on the drawings) the electrical circuits are closed to the said solenoids in such a manner as to cause the transmission to be shifted into any gear or neutral position.

Figure 2:
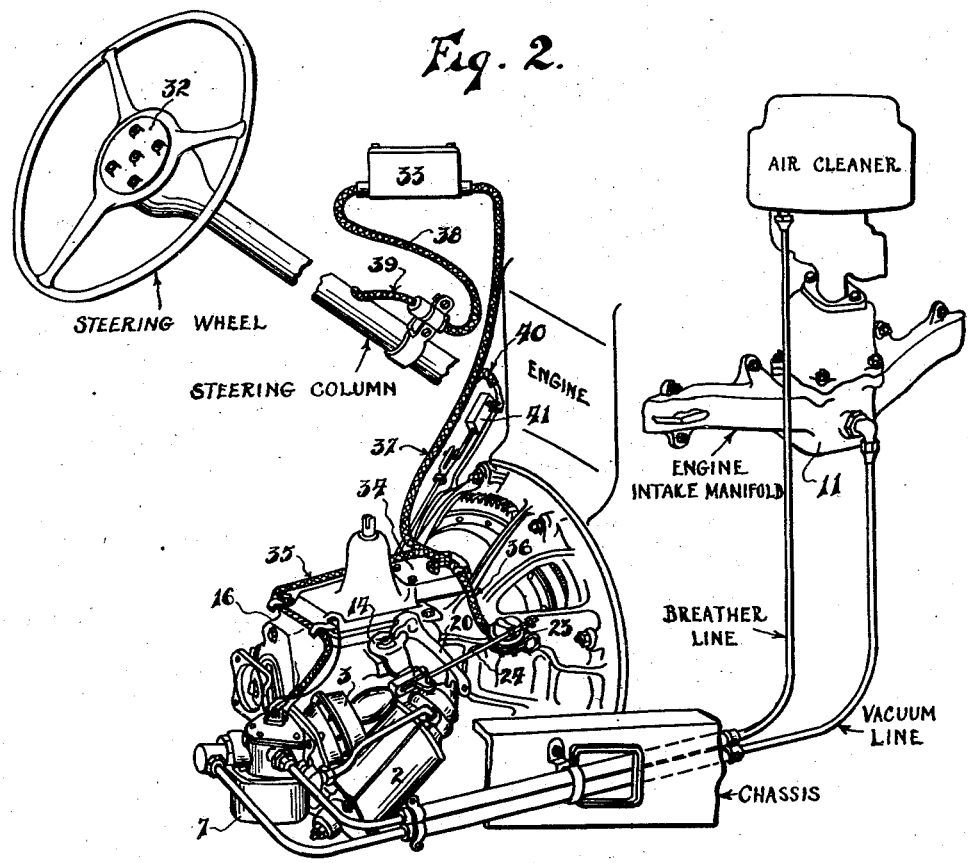
Figure 2 is a perspective view of a successful vacuum actuated transmission showing various parts of the present invention applied thereto.

In order to more fully understand the actuation of the present invention as applied to a vacuum operated transmission as shown on the drawings in Figures 1 and 2, a description is herein given of the actuation of the said transmission in regards to the method used to apply the vacuum power and shift the gears into various positions.

Referring to Figure 1 which shows the transmission in low gear position, with the low and reverse gear shifting rod 8 moved to the right. This had previously been accomplished by simultaneous operation of valves 6 and 4. Valve 6 had shut off atmospheric pressure from passage 9 and had opened passage 10 to allow vacuum to be drawn from intake manifold 11 (Figure 2) through tube 6B, which caused the diaphragm piston 12, and rod 13 and cross-shift lever 14, to move the shaft 15 in a direction outwardly of the transmission housing 16, and thereby allow the shifting lug 17 to engage with the low and reverse gear shifting yoke 18; then valve 4 was operated, which in like manner to valve 6, allowed vacuum to be drawn from intake manifold 11 (Figure 2), through tube 4B, which caused the piston 1 to be drawn up, likewise moving its associated rod 19, and causing the bell crank shifting lever 20 to rotate counter-clockwise, which moved the low and reverse shifting rod 8 to the right and yoke 18 shifted the transmission into low gear position.

The simultaneous operation of valves 6 and 5 in the present position of the transmission in low gear would cause the diaphragm piston 12 to keep the cross shift engaged with the shifting rod 8 and valve 5 would allow vacuum to be drawn from the intake manifold, through tube 5B and draw the piston 1 down, which would rotate the lever 20 and shaft 15 clockwise and thereby move the shifting rod 8 to the left until the yoke had shifted the gears into reverse gear position.

When a shift into high or second gear is made, the valve 6 is not operated, and with atmospheric pressure in tube 6B the normal tension of the diaphragm piston spring 12A, by linkage with the rod 13, cross-shift lever 14, and bell crank shifting lever 20, causes the shaft 15 to move into the transmission so that the shifting lug 17 keeps in engagement with the high and second gear yoke 21 and its associated shifting rod 22.

The shift into high gear position is made by operation of valve 4 only, which causes the shifting piston 1 to move up, the lever 20 and shaft 15 to rotate counter-clockwise and shifting lug 17 moves the yoke 21 to the right into high gear position.

When the shift into second gear position is made, valve 5 only is operated, which causes the shifting piston 1 to move down, the lever 20 and shaft 15 rotates clockwise, and the shifting lug 17 moves the yoke 21 to the left into second gear position.

In the vacuum operated transmission as shown in Figures 1 and 2, the shifts from one gear position into another are always actuated through neutral position, thence to the new gear position. In this transmission this is accomplished by valve control through a plate contact block (not shown on the drawings) and an interlocking switch 23, which is linked with the diaphragm piston 12, and its associated rod 13, by means of the rod 24, which is pivoted to a lever arm 25. This arm 25 is connected to two rotatable semi-circular plates 26 and 27 which are insulated from and actuated by the arm 25.

As shown in Figure 1, the position of the plates in the switch 23 are such that plate 26 makes contact between terminals 30 and 31, and plate 27 makes contact between terminals 28 and 29. This position takes place when the cross shift is made to the low and reverse gear shift rod 8 and yoke 18, as shown.

Figure 12 shows the position of arm 25 which takes place when the diaphragm piston 12 is in normal position with the cross-shift in position to shift the high and second gear shifting rod 22. In this position the plate 26 makes contact between terminals 28 and 31, and the plate 27 makes contact between terminals 29 and 30.

Referring to Figures 1 and 2, the various parts which compose this invention are the control button unit 32 and the relay unit 33, the sequential control unit 34, and the interconnecting wire cables 35, 36, 37, 38, 39, and 40.

In combination with the vacuum operated transmission as shown, the same electrically operated vacuum control valves, the same interlocking switch 23, and the same master switch 41 linked to the clutch pedal, are used with the present invention as hereinafter described.

In general, the present invention controls the preselection of a standard three speed forward and one speed reverse transmission, in such manner as to eliminate the necessity of manually preselecting each shift in its progressive sequence of low gear to second and thence to high gear position. In high gear position the control is preset to shift back into low gear position again to start the regular sequentially progressive shifting into high gear position.

If necessary the control may be preset to shift next into reverse gear position, by momentary pressure of the neutral and reverse gear buttons, after which the control automatically actuates to shift into low, second and high gear positions sequentially in this order.

Regardless of the gear position the control is set to shift into next, if the transmission is in neutral gear position another gear position may be preselected by a momentary pressure of its corresponding button, or the control may be set into neutral position by a momentary pressure of the neutral button. If the car is traveling in any gear position at the time the neutral button is pressed, the transmission will automatically shift into neutral gear position when next the master switch is actuated by operation of the clutch pedal, as follows:

When the transmission is any gear speed position other than neutral position, momentary pressure of the neutral button N causes negative battery to flow through wires 43, 44, 99 and 100, spring contact 127, stationary contact 128, wire 129, to the negative side of neutral relay NUT, and as the positive side of this relay is permanently connected to ground through wire 59, it becomes energized. Its associated normally-open holding contacts 131 and 132 close, and as they are connected to negative battery through wire 135, normally-closed contacts 134 and 133 of the relay CL, (which is deenergized) and wires 99, 44 and 43, relay NUT is accordingly held energized. When the clutch pedal is then depressed, the master switch is closed, which closes an electric circuit through the sequential control assembly 34, through one of the two sets of normally-closed contacts 72, 73 and 72A, 73A of the relay Cl, thence to one of the solenoids 4A or 5A, (depending on which solenoid is in the circuit through the contact plates 69 and 107, and terminals 70, 68, 108¹, 108, 68a and 114). This solenoid causes the gears to be shifted (as hereinafter described) into neutral gear position, in which position another electric circuit is completed through the contact plates 80 and 84, and the terminals 79, 81, 83 and 85, to the relay CL, which becomes energized and breaks the previously mentioned circuit to the relay NUT by opening of its contacts 134 and 133, which are in series from negative battery to the holding contacts 131 and 132 of the relay NUT (which becomes deenergized). After this occurs the contacts 57 and 58 close, allowing energization of any of the gear speed preselecting relays.

The function of the master relay CL in combination with the sequential control assembly 34, accomplishes the following purposes:

1. It assures the shifting of the gears into neutral gear position from each gear speed and reverse gear position, before shifting into another gear position.
2. It prevents continuous progressively sequential shifting, necessitating clutch operation for each separate gear speed position.
3. It assures shifting of both gear shifting control members to a neutral gear position, before cross shifting takes place between the said control members.
4. It holds the neutral preselecting relay energized, until the transmission is shifted into neutral gear position, thereby providing automatic actuation of the said relay upon momentary contact button operation thereof.

Of course, it is understood in the above explanation, that each gear shift is actuated only after the clutch pedal is fully depressed, which completes the electric circuit through the master switch 41, to the vacuum control valves, and simultaneously disengages the engine clutch, as is the case with the electrically controlled vacuum operated transmission shown, before this invention is applied.

The following description applies to Figure 1, but can also be applied to Figure 1A, which is a schematic wiring diagram, omitting mechanical details of the invention, but showing all electrical wiring and parts having the same numbers as shown in Figure 1. The movements of the various relay contacts in energized position is indicated by arrows on dotted lines connected to the movable contacts. Arrows also indicate the movement of the control unit contacts blocks to various gear positions.

It will be noted that Figure 1 shows the transmission 16 in low gear position. This position is, of course, the first to take place in the progressive sequential shifting to place the transmission in high gear, or the normal cruising speed of the vehicle.

Assuming that the vehicle is in neutral gear position and standing idle with the engine off, the driver first presses the clutch pedal, then turns on the ignition switch and starts the engine. With the ignition switch on, battery current is available to operate the shifting of the transmission, by supplying current to wire 44 and the stationary contact 41 of the master switch.

As is the case with the present vacuum operated transmission, the clutch pedal must be depressed to supply battery current to operate the engine starter. The purpose of this is to assure the disengagement of the engine clutch, in case the vehicle had previously been stopped while in a gear speed position. The neutral gear button N is always pressed into operation after the clutch pedal is depressed, especially so, if one of the indicating pilot lights S, H or R is lighted to indicate the preselection of one of these gear shifts.

Assuming that the vehicle had been left in low gear position, as shown in Figure 1; then the operation of the neutral button N would energize the neutral relay NUT, as previously described, which would deenergize all preselecting relays S, L, H and R and prevent their operation until after the transmission is shifted into neutral gear speed position, and the closing of the master switch, (by depressing the clutch pedal) would cause negative battery to flow from the master switch movable contact 65, wires 66 and 67, to contact 68 of the sequential control unit 34, thence through contact plate 69, contact 70, and wire 71, through the normally closed contacts 72 and 73 of the relay CL, thence through wires 74 and 75, to the negative side of solenoid 5A. As the positive side of this solenoid is permanently connected to positive battery through ground, it would become energized, thereby opening vacuum valve 5, which would allow vacuum to draw through tube 5B, and pull piston 1, in the vacuum shifting cylinder 2, down to midway position therein.

This movement of piston 1 would rotate the lever 20, shaft 15 and shifting lug 17, clockwise, thereby moving the low and reverse shifting fork 18 to the left into neutral gear position.

If the transmission had been in any other gear speed position the operation of the neutral button N would deenergize any preselected relay, and it would have also shifted into neutral gear position, by means of the two sets of plates 69 and 107, and their associated contacts 70 and 108¹, and 114 and 108, respectively. These plates and associated contacts always function to assure the shifting from any gear speed to neutral, before again shifting into another gear speed position.

The driver is now ready to start shifting the transmission of the vehicle progressively from neutral to low to second, thence to high gear position. With the clutch pedal still depressed, he momentarily presses the low gear button L of the control button unit 32. This action allows negative battery to flow from wire 44, through wires 99 and 100, the normally closed contacts 127 and 136 of the button N, wire 137, contacts 138 and 139 of the button S, and wire 140, to the movable contact 141 of the said button L. The pressure of button L closes its associated contacts 141 and 141¹, which allows negative current to flow through wires 112¹ and 112 to the negative side of the coil 113 of the relay LOW. Positive battery is supplied to coil 113 from the battery, through ground, thence through wires 59, and 58, the normally closed contacts 57 and 56 of the relay NUT, wire 55, the normally closed contacts 62 and 63 of the relay SEC, (this relay is in normal deenergized position, and not as shown in Figure 1.) and wire 63¹ to the positive side of the coil 113.

Relay LOW then becomes energized and its armature closes the normally open sets of contacts 117 and 116, 121 and 120, and 119 and 118. The closing of contacts 117 and 116 allows negative current to flow from wires 44 and 45, through the contact 46A, contact plate 47A and contact l of the sequential control unit 34 (Fig. 13), thence through wire 115, the said contacts 116 and 117, and wire 112 to the negative side of the coil 113 of the relay LOW. This action holds the relay energized until the transmission has shifted into low gear position, at which time the negative circuit is opened by the contact plate 47A moving out of contact with the terminal contact l. (See Figure 16.) These holding contacts 117 and 116 function immediately after the button L is pressed, thereby necessitating a momentary pressure only on the button.

The closing of contacts 121 and 120 allows negative battery to flow direct from the closed master switch, through wires 66 and 66A, the said contacts, and wire 122 to the negative side of the solenoid 6A. As the positive side of this solenoid is permanently connected to the positive battery through ground, it becomes energized, which action operates the vacuum valve 6 and allows vacuum to operate the diaphragm piston 12 in the diaphragm cylinder 3.

This action in turn, due to the linkage of the rod 13 and lever 14, moves the shaft 15 out of the transmission case, thereby engaging the shifting lug 17 with the shifting fork 18. The linked rod 24 and arm 25 also moves the plates 26 and 27 of the interlocking switch 23, so that contacts 30 and 31 are connected together by plate 26. (As shown in Figure 1.)

The closing of contacts 119 and 118 allows negative battery to flow direct from the closed master switch, through wires 66 and 66¹, the closed (normally open) contacts 93 and 92 of the relay CL. Relay CL had previously been energized by the flow of the negative battery through the closed master switch, wires 66, 67 and 78, contact 79, contact plate 80, contact 81, wire 82, contact 83, contact plate 84, contact 85 (Fig. 13), and wire 86 to the negative side of the coil 87 of the relay CL. Negative battery thence flows through wire 94 to the terminal contact 30, plate 26 and terminal contact 31 of the interlocking switch 23, thence through wire 123, the said contacts 118 and 119, and wires 124, 125 and 126 to the negative side of the solenoid 4A.

As the positive side of solenoid 4A is permanently connected to positive battery through ground, it becomes energized, which action causes the valve 4 to open, allowing vacuum to be drawn through tube 4B, which moves the shifting piston 1 from midway or neutral position up, to shift the transmission into low gear position as shown in Figure 1.

Bear in mind that all of the above action involved in shifting the transmission from neutral into low gear position was done in a few seconds, during which time the driver kept the clutch pedal depressed and the master switch engaged. While in neutral position, the relay CL was energized through the series connection of the contacts and plates 79, 80, 81 and 83, 84, 85. It was held energized through its associated holding contacts 88 and 89 which were supplied with negative battery direct from the master switch, through wires 66 and 90. These holding contacts keep the relay CL energized until the preselected gear shift is made, and the relay's associated normally closed contacts 97 and 98 are kept open to prevent a continual sequential shifting; as these contacts supply negative battery from wires 44, 99 and 100, through wires 101 and 102, and terminal contacts 103A and 103, respectively to the contact plates 104A and 104, of the sequential control unit 34, which in turn supply negative battery, by sliding contact with their associated contact terminals S, L and L, H, to the preselectings relays SEC, LOW and HI.

The function of these last mentioned contact terminals and contact plates of the sequential control unit 34, provides the sequential preselection of gear speed positions progressively; and their interlocking connection with the contacts 97 and 98 prevents a continuous sequential gear shifting of the transmission unless the master switch is first closed before each shift.

When the driver released the clutch pedal and thereby opened the master switch, after the shift was made into low gear position, the relay CL became deenergized and its associated contacts 97 and 98 closed, allowing negative battery to flow through wires 101 and 102, contact 103A, contact plate 104A, contact S, thence through wires 51¹, 51 and 52 to the negative side of coil 53 of relay SEC. This relay is kept energized as later explained, and all parts are then as shown in Figure 1.

Referring to Figure 1, which shows the transmission 16 in low gear position and the second gear relay SEC of the relay unit, energized. Negative current is connected from the battery 42, wires 43 and 44 to the terminal 46 of the control unit through plate 47, terminal s, wire 48, normally open coil holding contacts 49 and 50 on the SEC relay, and wires 51 and 52 to the negative side of the relay coil 53. The positive side of said coil is connected by wires 54 and 55, normally closed contacts 56 and 57 of the relay NUT, and wires 58 and 59 to ground, thence to the positive side of the battery 42. The relay SEC is shown in energized position with normally open contacts 49 and 50, and 60 and 61 closed; and normally closed contacts 62 and 63 open. The last mentioned contacts break the circuit on the positive side to relays LOW, HI, and REV, thereby preventing their operation when the SEC relay is energized.

It will be noted that each shift relay including NUT have these normally closed contacts which interlock the relays on the positive battery side to prevent simultaneous energization, and are connected in predominating order of NUT first, then SEC, LOW, HI and REV last. The momentary contact control buttons are likewise connected through normally closed contacts on the negative battery side to prevent simultaneous energization of the relays if two or more buttons are pressed simultaneously, which would result in the energization of the predominating relay only. In continuation of the description in the preceding paragraph, the relay SEC is now in position for the shift from low to second gear position. When the driver desires, he presses the clutch pedal fully, which closes the master switch contacts, which causes negative current to flow from the battery 42, through wires 43 and 44, master switch contacts 64, and 65, wires 66 and 67, control unit terminal 68, contact plate 69, terminal 70, thence through wire 71, normally closed contacts 72, and 73 of the relay CL, and wires 74, and 75 to the negative side of the coil of the solenoid 5A which operates the vacuum control valve 5. As the positive side of this solenoid coil is permanently connected to positive battery through ground, it is energized permitting vacuum to draw the shifting piston 1 down to its midway point in the cylinder 2, at which position the transmission is in neutral gear position.

Referring to Figures 1 and 13, in this gear position the cross shift assumes its normal position with the shifting cylinder connected to the shift rod 22 due to the tension of the spring 12A against the diaphragm piston 12. The linked rods 13 and 24 also cause the interlocking switch 23 to assume its normal position (as shown on Fig. 12), and its contact plate 27 forms a path of conductance between terminals 29 and 30.

When this occurs the shift rod 8 has moved to the left, drawing the linked rod 76A and plate block 77A of the control unit with it to neutral position. In this position negative current is picked up from wire 67 (the master switch contacts still being closed), and flows through wire 78, control unit terminal 79, contact plate 80, terminal 81, wire 82, terminal 83, contact plate 84, terminal 85, and through wire 86 to the negative side of the coil 87 of the relay CL. As the positive side of this coil is permanently connected to positive battery through ground it becomes energized closing and opening its various sets of contacts. The closing of normally open coil holding contacts 88 and 89, keeps the coil energized as long as the master switch contacts are closed, by allowing negative current to flow from wires 66 and 90, and through the said contacts and wire 91 to the negative side of coil 87.

The opening of normally closed contacts 72 and 73 breaks the circuit on the negative battery side, to the solenoid coil 5A. However, due to the closed contacts 60 and 61 of the relay SEC, and the closing of terminals 29 and 30 of the interlocking switch 23, as described above, negative battery flows through the closed master switch, wires 66 and 66¹, through the contacts 93 and 92 (which closed when the relay CL became energized), thence through wire 94, terminal 30, contact plate 27, (Fig. 12) terminal 29, thence through wires 95 and 96, the said contacts 60 and 61, thence through the wire 75, to the negative side of the solenoid coil 5A.

This solenoid coil accordingly continues to be energized and its vacuum control valve 5 allows vacuum to continue to actuate the shifting piston 1 down until it has shifted the transmission into second gear position.

Referring to Figures 1 and 14, in this new gear position the shift rod 22 has moved to the left, drawing with it the linked rod 76 and plate block 77 and the contact plate 47 has moved out of contact with the terminal s which breaks the circuit on the negative battery side to the holding contacts 49 and 50 of the relay SEC, which becomes de-energized.

Nothing further happens until the driver takes his foot off the clutch pedal, thereby opening the master switch contacts at which time the relay CL becomes de-energized and its normally closed contacts 97 and 98 (which had been opened) close again, allowing negative current to flow from the battery 42 through wires 43, 44, 99 and 100, the said contacts, wires 101 and 102, control unit terminal 103, contact plate 104 and terminal H (bear in mind that the shifting rod 22 has moved to the left into second gear position, drawing its linked rod 76 and plate block 77 with it to the left), thence through wire 105 to the negative side of the coil 106 of relay HI. As the SEC relay has just become de-energized, and all other relays are de-energized their positive interlocking normally closed contacts allow positive battery to flow from ground to the positive side of the HI relay coil 106. This relay is then preset to control the shift from second to high gear position, at any time the driver so desires, by actuation of the clutch pedal and its linked master switch.

The gear shift from second to high electrically functions similar to the previous description, that is, when the master switch is closed, the contact plate 107 and terminal 108 of the control unit is set to electrically energize control valve solenoid 4A, which causes shifting piston 1 to move up to midway position thereby shifting the transmission into neutral gear position. Then, due to the new position of the contact blocks of the control unit 34 (Fig. 13) the relay CL is energized through the series connection of terminals 79, 81, 83, 85 and contact plates 80 and 84; the circuit to solenoid valve 4A is broken by opening of contacts 72A and 73A of the relay CL, simultaneously with the closing of its contacts 92 and 93, which continues the energization of the said solenoid through terminals 30 and 29, and contact plate 27 of the interlocking switch 23, wire 95, and contacts 109 and 110 of the relay HI, which causes the shifting piston 1 to continue to move up until the shifting rod 22 moves to the right into high gear position.

In this position the contact block 77 having also moved to the right (Fig. 15), breaks the circuit to relay HI by contact plate 47 opening from terminal h. When the clutch pedal is released and the master switch is thereby opened, relay CL is deenergized by the breaking of the circuit to it on the negative battery side through its holding contacts 88 and 89. The normally closed contacts 97 and 98 are again closed, which allows negative battery to flow through wires 43, 44, 99 and 100, the said contacts, and wires 101 and 102 to terminal 103 and contact plate 104, thence through terminal L, and wires 111 and 112 to the negative side of the coil 113 of relay LOW. As relay HI and all other shift relays are in de-energized position their normally closed positive battery interlocking contacts are closed allowing positive battery to flow to the positive side of coil 113, and the relay LOW then becomes energized and preset to next shift the transmission into low gear position, when the clutch pedal and linked master switch are actuated again.

Although the transmission is now in high gear position (Fig. 15) it is preset to shift into low gear position, when the vehicle driver stops, for example due to traffic congestion, and it is necessary to shift the transmission back into high gear position progressively and sequentially through low, second and high gears.

With the transmission in high gear position the shift rod 22 and contact plate block 77 is in position to the right (Fig. 15) with contact plate 107 engaging terminal 114. Also shift rod 8 and contact plate block 77A being in neutral position, has contact plate 47A engaging terminal t, which allows negative battery to flow through wires 43, 44, and 45, terminal 46A, contact plate 47A, terminal t, and wire 115, normally open holding contacts 116 and 117, thence to the negative side of the coil 113 of relay LOW, keeping it energized and preset to shift the gears next into low gear position.

Then when the vehicle driver fully depresses the clutch pedal, thereby closing the master switch contacts 64 and 65, the following takes place:

Negative battery flows from battery 42 through wires 43, and 44, the said master switch contacts, wires 66, and 67, terminal 68A, contact plate 107, terminal 114, wires 71A and 71, normally closed contacts 72 and 73 of the CL relay, through wires 74 and 75 to the negative side of the solenoid coil 5A of vacuum control valve 5, and as the positive side of this coil is permanently connected to positive battery through ground, the solenoid actuates valve 5 to allow vacuum to draw the shifting piston 1, in the vacuum cylinder 2, down to shift the transmission into neutral gear position.

Simultaneously with the above, when the master switch 41 is closed, negative battery also flows from wire 66, through wire 66A, the closed contacts 120 and 121 of the energized relay LOW, through wire 122 to the negative side of the solenoid coil 6A, and as the positive side of this coil is also permanently connected to positive battery through ground it becomes energized at the same time as solenoid 5A.

Therefore vacuum flows simultaneously through valves 5 and 6 to actuate shifting piston 1 and diaphragm piston 12. Piston 1 moves down to shift the shifting rod 22 into neutral position, and piston 12 immediately cross-shifts the shifting lug 17 out of mesh with yoke 21 and into mesh with yoke 18. As soon as this occurs rod 24, (linked to piston 12) moves the interlocking switch 23 into the position as shown in Figure 1, which allows negative battery to flow from master switch 41 (which is still in closed position) through wires 66 and 66', and through the normally open contacts 93 and 92 of the relay CL, which was energized when the shift rod 22 reached neutral position, by the flow of negative battery from wire 66, through wires 67 and 78, terminal 79, plate 80, terminal 81, wire 82, terminal 83, plate 84, terminal 85 and through wire 86 to the negative side of the coil 87 of relay CL. From contact 92 negative battery flows through wire 94 to terminal 30 on the interlocking switch 23 (Figure 1) thence through plate 26, terminal 31, and wire 123, through the closed contacts 118 and 119 of the energized relay LOW, thence through wires 124, 125 and 126 to the negative side of the solenoid coil 4A, which operates vacuum valve 4 to allow vacuum to draw the shifting piston 1 up and move the shift rod 8 and yoke 18 into low gear position, as shown on Figure 1.

As previously explained above, the gear shift preselecting relays are interlocked on their positive or ground side through normally closed contacts, to prevent simultaneous operation of more than one relay at a time. These interlocking contacts are so connected to give a predominating order of NUT first, then SEC, LOW, HI and REV last.

The momentary contact buttons are likewise interlocked on the negative battery side in predominating order similar to their associated relays. With the transmission in neutral, any gear speed position can be preselected by manual operation of its corresponding button. Any gear speed position can be manually preselected if it predominates over the gear speed position automatically preselected through the sequential control unit. If it does not predominate, then the neutral button N must be momentarily pressed, and after the transmission has shifted into neutral gear position, the desired gear speed can then be manually preselected.

In explanation, it is a common practice to shift from high into second gear position when in traffic. With the present invention, and the transmission in high gear position, the sequential control unit is set to automatically shift the transmission next into low gear. (Figure 15.) If it is desired to manually preselect second gear instead, the driver momentarily presses button S, which causes negative battery to flow through wires 43, 44, 99 and 100, through spring contact 127, contact 136, wire 137, spring contact 138, thence through contact 51A, wires 51 and 52, thence to the negative side of the SEC coil 53. Then as the positive side of this coil is connected by wires 54 and 55, closed contacts 56 and 57, and wires 58 and 59 to the positive ground, the relay SEC becomes energized and stays energized by the closing of its normally-open holding contacts 50 and 49. Its normally-closed interlocking contacts 62 and 63 open, thereby breaking the positive circuit to the relay LOW which becomes deenergized.

Referring to Figures 1, 1A, 15 and 14, with the transmission in high gear position and manually preselected to next shift into second gear. The shift rod 22 and contact plate block 77 is in position to the right (Fig. 15) with contact plate 107 engaging terminals 114 and 68A. Also contact plate 47 is engaging terminals 46 and s, which allows negative battery to flow through wires 43, 44, terminal 46, contact plate 47, terminal s, wire 48, normally open holding contacts 49 and 50, (now closed) thence to the negative side of the coil 53 of the relay SEC, keeping it energized and preset to shift the gears next into second gear position.

Then when the driver fully depresses the clutch pedal, thereby closing the master switch contacts 64 and 65, the following takes place:

Negative battery flows through wires 43 and 44, the said master switch contacts, wires 66, 67 and 67¹, terminal 68A, contact plate 107, terminal 114, wires 71A and 71, normally closed contacts 72 and 73 of the relay CL, through wires 74 and 75 to the negative side of the solenoid 5A of the vacuum control valve 5, and as the positive side of this relay is permanently connected to positive battery through ground, the solenoid actuates valve 5 to allow vacuum to draw the shifting piston 1, in the vacuum cylinder 2, down midway to shift the transmission into neutral gear position (Fig. 13).

In this position (Figs. 1 and 1A) negative battery flows from the closed master switch through wires 66, 67 and 78, terminal 79, plate 80, terminal 81, wire 82, terminal 83, plate 84, terminal 85, and through wire 86 to the negative side of the coil 87 of relay CL, which becomes energized. Simultaneously, negative battery flows from the closed master switch, through wires 66 and 66¹, the normally open contacts 93 and 92 (now closed) of the relay CL, wire 94, terminal 30, plate 27, and terminal 29 of the interlocking switch 23 (Fig. 12), thence through wires 95 and 96, the closed (normally open) contacts, 60 and 61 of the relay SEC, and wire 75 to the negative side of the solenoid 5A, which operates valve 5 to allow the shifting piston 1 to continue to be drawn down until it has shifted the gears into second gear position. (Fig. 14.)

After the driver has released the clutch pedal and thereby opened the master switch, the relay CL becomes deenergized and the closing of its associated contacts 97 and 98 allows negative battery to flow through wires 43, 44, 99 and 100, the said contacts, wires 101 and 102, terminal 103, plate 104 and terminal H of the control unit 34 (Fig. 14), thence through wire 105 to the negative side of coil 106 of relay HI. This relay becomes energized, and preselects the control to next shift automatically into high gear position.

As previously explained, if the vehicle driver desires to shift the transmission into reverse gear position, for instance when it is in low gear and preset to shift into second gear as shown on Figure 1, a momentary pressure of the neutral button N would energize the neutral relay NUT by allowing negative battery to flow from the battery 42, through wires 43, 44, 99 and 100, button spring contact 127, stationary contact 128, and wire 129 to the negative side of coil 130 of the relay NUT. As the positive side of this coil is permanently connected to positive battery through ground, it would become energized, and the normally open holding contacts 131 and 132 would close and keep it energized by the flow of negative battery from wire 44, through wire 99, normally closed contacts 133 and 134 on the relay CL (which is de-energized, as shown), and through wire 135 to the said holding contacts 132 and 131.

The energization of relay NUT would, by the opening of the normally closed positive battery interlocking contacts 57 and 56, de-energize relay SEC, by breaking the positive circuit to it, as well as all other shift relays.

This would preset the relay unit to neutral position and prevent progressive sequential shifting of the transmission. Then, when the vehicle driver desires to shift into reverse gear position he fully depresses the clutch pedal, which allows negative battery to flow through master switch 41, (Figures 1 and 16) wires 66 and 67, terminal 68, contact plate 69, terminal 70, wire 71, through normally closed contacts 72 and 73 of relay CL, and wires 74 and 75 to the negative side of the solenoid coil 5A, which becomes energized operating the vacuum valve 5, which allows vacuum to draw shifting piston 1 down to midway position, at which point the gears are in neutral position, and the contact blocks 77 and 77A in like position (Fig. 13) cause the energization of the relay CL through the series connection of the terminals 79, 81, 83 and 85 and contact plates 80 and 84, as previously explained. The energization of this relay causes the breaking of normally closed contacts 72 and 73, which in turn breaks the circuit to solenoid coil 5A, thereby stopping action of piston 1. Simultaneously, the normally closed contacts 133, and 134 of the relay CL open, breaking the holding circuit on the negative battery side, through wire 135 and holding contacts 132 and 131, to the neutral relay NUT, which de-energizes it, and allows the positive battery interlocking contacts 57 and 56 to close, to complete the path on the positive side to all shift relays in the relay unit 33.

At this time the vehicle driver, (while keeping the clutch pedal fully depressed) momentarily presses the reverse gear button R, which allows negative battery to flow through wires 43, 44, 99 and 100, normally closed contacts 127 and 136, wire 137, contacts 138 and 139, wire 140, contacts 141 and 142, wire 143, contacts 144 and 145, wire 146, and thence through the depressed spring contact 147 and stationary contact 148, and wire 149, to the negative side of coil 150, and the relay REV becomes energized and is held so by the closing of its associated holding contacts 151 and 152, which are supplied with negative battery from wires 43, 44 and 45, terminal 46A, contact plate 47A, terminal r, and wire 153.

As soon as relay REV is energized the closing of its associated normally open contacts 156 and 157 allows negative battery to flow through the closed master switch 41, wire 66, the said contacts, and wires 158 and 122 to the negative side of the solenoid 6a, which operates valve 6 to allow vacuum to hold the diaphragm piston 12 and the shift lug 17 into engagement with the yoke 18.

The closing of normally open contacts 154 and 155 of the relay REV, simultaneously with the above action, allows negative, battery to also flow thereto from wire 66 through wire 66′, the closed contacts 93 and 92, (relay CL having previously been energized) through wire 94, terminal 30 of interlocking switch 23, (Figure 1) contact 26, terminal 31, wire 123 and 123′, thence through the said contacts 154 and 155, and through wires 74′, 74 and 75 to the negative side of the solenoid 5A, which operates the valve 5 to allow vacuum draw the piston 1 down until the yoke 18 has shifted the gears into reverse gear position.

In this new gear position (Fig. 17) the contact block has moved to the left and the contact plate 47A has moved out of engagement with the terminal r, thereby breaking the circuit to the relay REV on the negative side, and it becomes de-energized. The contact plate 104A has also moved into engagement with the terminal L, so that when the vehicle driver releases pressure on the clutch pedal, and the relay CL thereby becomes de-energized, (holding contacts 88 and 89 keeps relay CL energized so long as the master switch is closed) negative battery is allowed to flow through its associated normally closed contacts 97 and 98, wire 101 and 102, to terminal 103A, thence through the said contact plate 104A and terminal L, through wires 111 and 112 to the negative side of the coil 113 of the relay LOW, which becomes energized to preset the transmission to automatically shift into low gear position again, when the vehicle driver next actuates the clutch pedal and its linked master switch 41.

*Control button unit—with pilot lights*

Figure 3:
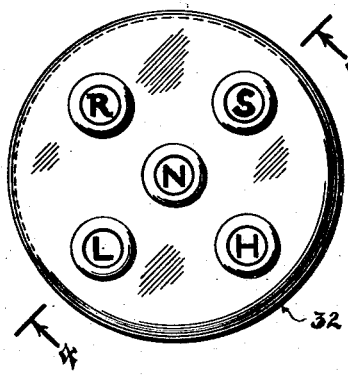
Figure 3 is a plan view of the control buttons as located in the center of the motor vehicle steering wheel as shown in Figure 2.
Figure 4:
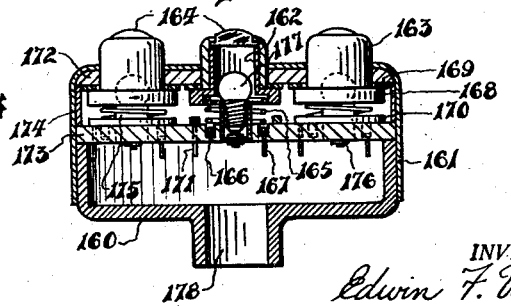
Figure 4 is a sectional view taken substantially on the line 4—4 of Figure 3.

As shown in Figures 3 and 4, the control button unit 32 is constructed in a circular case 160, which has a cover 161 through the top of which protrudes the buttons N, R, S, L and H in position as shown in Figure 3, which positions correspond to that of the old type ball shift handle when the transmission is in the various gear positions.

Each button has a brass cylindrical body 162 which has male threads which engage female threads of the outside portion 163 made of Bakelite, and as shown, these two portions of the button body hold the transparent glass button top 164 in place. On the underside of this glass is painted the letter indicating the name of the gear shift. The lower part 168 of the body 162 acts as the movable contact and is electrically connected to the wiring through the spring 165, washer 166 and terminal 167 soldered thereto. The contact portion 168 of the body 162, and the upper brass or copper ring 169 form the normally closed interlocking contacts of each button, (as shown in Figure 1 for instance at 127 and 136 of the neutral button N). The stationary contact of each button is in the form of a brass ring as at 170 which has a terminal 171 to which is connected the wire leading to the negative side of each relay coil (shown in Figures 1 and 1A, for instance at 128 with wire 129 to the coil 130).

The said buttons and contacts set between two Bakelite supports 172 and 173 kept apart by a ring spacer 174. The contacts 169 are secured to the upper support 172, and the contacts 170 and spring washers 166 and associated terminal 167 are secured in the lower support 173 as shown.

In the center of each button and secured to the lower support 173 are miniature sockets 175, the tips 176 of which are electrically connected to the terminals 171, and therefore to the negative side of each shift relay (as shown on Figures 1 and 1A). As the inside diameter of the buttons is larger than the sockets and their lamps 177, the buttons when depressed move down over the lamps. This construction allows the lamps to be mounted closer to the glass tops 164 for better visability of the shift indicating letter when the lamps are illuminated, and allows a more compact and smaller complete button unit. The shell sides of each socket are permanently connected to ground. The wire cable 39 (Figure 2) is connected to the button unit 32 in the hub 178 of the button case 160.

As can be seen by the above description, each shift button has an associated pilot lamp, the shell side of which is permanently connected to positive battery through ground, and the tip side of which is permanently connected to the negative battery side of each shift relay (shown on Figures 1 and 1A). These connections cause the pilot lamps to light up simultaneously with the energization of each shift relay, so that the vehicle driver may see at all times the preset gear shift by illumination of the corresponding indicated button.

The combination of buttons and pilot lights in one unit simplifies the construction and electrical wiring and connections. The placing of the button unit in the center of the steering wheel as shown in Figure 2, makes the location of the control buttons more convenient and visible to the vehicle driver, and in such position as not to interfere with the operation of the steering wheel or other controls of the vehicle.

*Sequential control unit*

In Figure 2, and as shown at 34 is located the sequential control unit of this invention, the function of which controls the automatic sequential and progressive shifting of the gears in the transmission as shown at 16. This unit is located in similar position as the contact block of the vacuum operated transmission to which this invention is applied, but is constructed and actuated in different manner as hereinafter described.

Referring to Figures 5 to 8, inclusive, the sequential control unit is housed in a body 180 of sheet steel, having mounting holes 181, and a cover 182 of Bakelite which is attachable to the body 180 by screw means, and which supports the wire clips 183 of the contact block terminals such as 79.

Located inside the body 180 are two contact blocks 77 and 77A which are movable longitudinally between the Bakelite base 186 and the Bakelite terminal block 187. The contact block 77 is shown in neutral gear position and the contact block 77A is shown in low gear position, corresponding to the positions of these parts as shown in Figures 1 and 16. These blocks are connected respectively to the high and second gear shifting rod 22, and the low and reverse gear shifting rod 8, by means of the contact block rods 76 and 76A respectively. The said contact blocks are constructed of steel or brass as the base, to which are attached the said block rods, and the Bakelite tops as shown at 188, in which are secured the various contact plates 47, 80 (Figure 6) etc., flush with the top of the blocks 188, as shown in Figures 6 and 7, so that the various terminals (as at L, 103A, S, etc.) will easily slide thereon when the contact blocks are moved simultaneously with the shifting rods 22 and 8.

As shown in Figure 5, the various contacts and terminals are grouped in three rows on each block, in order to make a more compact and smaller assembly unit, and there is sufficient space in the body or case 190 at each end of the blocks 77 and 77A to allow them to move the same distance that the shifting rods 22 and 8 move, from neutral to other gear positions.

In Figures 13 to 17 inclusive are shown all the different positions of the groups of contacts and their associated terminals. These are shown grouped in one line for each contact block, the same as shown in Figures 1 and 1A for simplicity in tracing the various circuits. In the foregoing description these figures are referred to as the various circuits are described in detail. In these figures the contact blocks are shown connected to their associated shifting rods and the gearing of the transmission is shown in its true position for each gear position, in order to fully illustrate the relationship of the sequential control unit to the various gear shift positions of the transmission. Each of the various parts, terminals, contact plates, etc. have the same numbers in each figure of every drawing.

*Alternate sequential control unit*

Referring to Figures 9, 10 and 11, if it is desired to use the present invention as an attachment to a manual electrical controlled vacuum operated transmission similar to that as shown and described herein, in lieu of placing the sequential control unit 34 as shown in Figure 2, and actuated as previously described, it may be placed in such position over the shifting shaft 15 and shifting lever 20 (Figures 9 and 10) so that a lever 190 may be installed on the said shaft 15, between the said lever 20 and the transmission case 16, and secured thereto and rotatable therewith. Attached to the bottoms of the blocks 77 and 77A are metal lugs 191 and 192, and 193 and 194 respectively, which form a slot 195 slidingly engageable with the portion 190A of the lever 190. A portion 196 is cut out of each block to allow clearance for the movement of the portion 190A of the lever 190 and a rectangular portion 197 is cut from the Bakelite base 186 to allow clearance for the lugs 191, 192, 193 and 194 when they move with their respective blocks.

This movement is imparted by engagement of the portion 190A of the lever 190, which rotates clockwise or counter-clockwise with the shifting shaft 15, depending on which gear position is shifted into. As shown in Figure 10, the cross-shift is in normal or high and second gear shifting position, and the lever 190 engages the contact block 77 by means of the lugs 191 and 192. When the cross-shift is in low and reverse gear shifting position and the shaft 15, lever 20 and lever 190 have moved to the right in the direction indicated by arrow B, the lever 190 engages the contact block 77A, by means of the lugs 193, and 194. When the shift is made into low gear position the lever 190 rotates clockwise (facing Figure 9), its portion 190A bears against the lug 194 and the contact block 77A is thereby moved to the right. When the shift is made into reverse gear position the lever 190 rotates counter-clockwise and the contact block 77A is similarly moved to the left, by means of the lug 193.

While I have necessarily shown and described the preferred embodiments of my invention somewhat in detail, it is to be understood that I may vary the size, shape, and arrangement of parts within wide limits without departing from the spirit of the invention.

Having thus described my invention, what I claim is:

1. In a change speed mechanism having clutch means and gear control members, shifting means including solenoids, contact switch means associated with and operable by the said control members, electromagnets having switch means, manually operable means to energize the said electromagnets one at a time, a master switch closed by the clutch means in the "out" position, and means whereby an electric circuit is formed through both said switch means by energization of one of the said electromagnets, the master switch when closed, and the said solenoids, so that the latter will shift the said gear control members into a gear speed position.

2. In a change speed mechanism having clutch means and gear control members, shifting means including solenoids, contact switch means associated with and operable by the said control members, electromagnets having switch means, manually operable means to energize the said electromagnets one at a time, a master switch closed by the clutch means in the "out" position, and means whereby an electric circuit is formed through both said switch means by energization of one of the said electromagnets, the master switch when closed, and the said solenoids, so that the latter will shift the said gear control members into a neutral gear position.

3. In a change speed mechanism having clutch means and gear control members, shifting means including solenoids, contact switch means associated with and, operable by the said control members, electromagnets having switch means, manually operable means to energize the said electromagnets one at a time, a master switch closed by the clutch means in the "out" position, and means whereby an electric circuit is formed through both said switch means by energization of one of the said electromagnets, the master switch when closed, and the said solenoids, so that the latter will shift the said gear control members into a neutral gear position, and means whereby another electric circuit is formed by energization of another said electromagnet and its associated switch means, the master switch when again closed, and the said solenoids, so that the latter will shift the said gear control members into a gear speed position.

4. In a change speed mechanism having clutch means and gear control members, shifting means including solenoids, contact switch means associated with and operable by the said control members, electromagnets having switch means, manually operable means to energize the said electromagnets one at a time, a master switch closed by the clutch means in the "out" position, and means whereby an electric circuit is formed through both said switch means by energization of one of the said electromagnets, the master switch when closed, and the said solenoids, so that the latter will shift the said gear control members, into a gear speed position, thence automatically by means of the first mentioned switch means energize another said electromagnet and the said solenoids, so that the latter will shift the said gear control members into a higher gear speed position, when the master switch is again closed.

5. In a change speed mechanism having clutch means and gear control members, shifting means including solenoids, contact switch means associated with and operable by the said control members, electromagnets having switch means, manually operable means to energize the said electromagnets one at a time, a master switch closed by the clutch means in the "out" position, and means whereby an electric circuit is formed through both said switch means by energization of one of the said electromagnets, the master switch when closed, and the said solenoids, so that the latter will shift the said gear control members into a gear speed position, and means operable automatically with the master switch again in closed position to shift the said control members into a higher gear speed position through the preceding operation of the said control members and their associated contact switch means.

6. In a change speed mechanism having clutch means and gear control members, shifting means including solenoids, contact switch means associated with and operable by the said control members, electromagnets having switch means, manually operable means to energize the said elcetromagnets one at a time, a master switch closed by the clutch means in the "out" position, and means whereby an electric circuit is formed through both said switch means by energization of one of the said electromagnets, the master switch when closed, and the said solenoids, so that the latter will shift the said gear control members into a gear speed position, and means operable automatically with the master switch again in closed position to shift the said control members into a lower gear speed position through the preceding operation of the said control members and their associated contact switch means.

7. In a change speed mechanism having clutch means and gear control members, shifting means including solenoids, contact switch means associated with and operable by the said control members, electromagnets having switch means, manually operable means to energize the said electromagnets one at a time, a master switch closed by the clutch means in the "out" position, and means whereby an electric circuit is formed through both said switch means by energization of one of the said electromagnets, the master switch when closed, and the said solenoids, so that the latter will shift the said gear control members into a reverse gear position, and means operable automatically with the master switch again in closed position, to shift the said control members into a forward speed gear position through the preceding operation of the said control members and their associated contact switch means.

8. In a change speed mechanism having clutch means and gear control members, shifting means including solenoids, contact switch means associated with and operable by the said control members, electromagnets having switch means, manually operable means to energize the said electromagnets one at a time, a master switch closed by the clutch means in the "out" position, and means whereby an electric circuit is formed through both said switch means by energization of one of the said electromagnets, the master switch when closed, and the said solenoids, so that the latter will shift the said gear control members into a gear speed position, and means operable automatically through the preceding movement of the said control members to break the circuit through the said energized electromagnet, and close the circuit through another said electromagnet when the master switch is again closed, to shift the said control members into neutral gear position, and means operable automatically through the last mentioned movement of the said control members to shift the gears into another speed position.

9. In a change speed mechanism having clutch means, shifting means including solenoids, shifting control means including a momentary contact switch and electromagnet for each gear speed and neutral gear position, contact switch means operable by the said shifting means, a master switch closed by the clutch means in the "out" position, and automatic control means whereby the energization of a single said electromagnet will progressively shift the gears automatically in sequence from low to second to high gear speed position, coacting with the operation of the said master switch to closed position for each said gear shift position.

10. In a change speed mechanism having clutch means, shifting means including solenoids, shifting control means including a momentary contact switch and electromagnet for each gear speed and neutral gear position, contact switch means operable by the said shifting means, a master switch closed by the clutch means in the "out" position, and automatic control means whereby the energization of a single said electromagnet will progressively shift the gears automatically in sequence from low to second to high gear speed position, coacting with the operation of the said master switch to closed position for each said gear shift position, and means operable automatically through the last movement of the shifting means and its associated said contact switch means, break the electric circuit to the control means of the high gear speed position, and when the master switch is again closed, close the circuit to the control means of the low gear speed position, to again automatically shift the gears progressively and sequentially as previously mentioned.

11. In a change speed mechanism having clutch means and parallel gear control members, each movable in opposite directions, vacuum operated shifting means operable by means including solenoids, contact switch assembly means operable by the said control members, electromagnets including switch means operable to control the said solenoids, manually operable means to energize the said electromagnets one at a time, a master switch closed by the clutch means in the "out" position, means whereby an electric circuit is formed through both said switch means, when closed by energization of one of the said electromagnets, the master switch when closed, and the said solenoids, so that the latter will shift the said control members into a gear speed position.

12. In a change speed mechanism having clutch means and parallel gear control members, each movable in opposite directions, vacuum operated shifting means operable by means including solenoids, contact switch assembly means operable by the said control members, electromagnets including switch means operable to control the said solenoids, manually operable means to energize the said electromagnets one at a time, a master switch closed by the clutch means in the "out" position, means whereby an electric circuit is formed through both said switch means, when closed by energization of one of the said electromagnets, the master switch when closed, and the said solenoids, so that the latter will shift the said control members into a gear speed position, and means operable automatically through the preceeding movement of the said control members to break the circuit through the said energized electromagnet, and when the master switch is again closed, close the circuit to another said electromagnet and said solenoids, to shift the said control members into a higher gear position.

13. In a change speed mechanism having clutch means and gear control members, shifting means including solenoids, contact switch means associated with and operable by the said control members, electromagnets having switch means, manually operable means to energize the said electromagnets one at a time, a master switch closed by the clutch means in the "out" position, and means whereby an electric circuit is formed through both said switch means by energization of one of the said electromagnets, the master switch when closed, and the said solenoids, so that the latter will shift the said gear control members into a gear speed position, and means operable automatically through the preceeding movement of the said control members to break the circuit through the said energized electromagnet, and close the circuit through a master electromagnet to another first mentioned electromagnet when the master switch is opened, and when the master switch is again closed, means operable automatically through the said master electromagnet and said contact switch means, to progressively shift the said control members into neutral gear position then into a lower gear speed position.

14. In a change speed mechanism having clutch means and gear control members, shifting means including solenoids, contact switch means associated with and operable by the said control members, electromagnets having switch means, manually operable means to energize the said electromagnets one at a time, a master switch closed by the clutch means in the "out" position, and means whereby an electric circuit is formed through both said switch means by energization of one of the said electromagnets, the master switch when closed, so that the latter will shift the said gear control members into reverse gear position, and means operable automatically through the preceeding movement of the said control members to break the circuit through the said energized electromagnet, and close the circuit through a master electromagnet to another first mentioned electromagnet when the master switch is opened, and when the master switch is again closed, means operable automatically through the said master electromagnet and said contact switch means, to progressively shift the said control members into neutral gear position then into a forward gear speed position.

15. In a change speed mechanism having clutch means and gear control members, shifting means including solenoids, contact switch means associated with and operable by the said control members, electromagnets having switch means, manually operable means to energize the said electromagnets one at a time, a master switch closed by the clutch means in the "out" position, and means whereby an electric circuit is formed through both said switch means by energization of one of the said electromagnets, the master switch when closed, and the said solenoids, so that the latter will shift the said gear control members into reverse gear position, and means operable automatically through the last movement of the shifting means and its associated said contact switch means to break the circuit through the said energized electromagnet, and close the circuit through a master electromagnet to another first mentioned electromagnet when the master switch is opened, and means operable automatically through the said master electromagnet, said contact switch means and said solenoids, so that the latter will move the said control members to progressively shift the gears automatically in sequence from low to second to high gear speed position, coacting with the operation of the said master switch to closed position prior to each gear shift position.

16. In a change speed mechanism having clutch means, two gear control members operable by shifting means including solenoids, contact switch means associated with and operable by both control members, electromagnets having switch means, manually operable means to energize the said electromagnets one at a time, a master switch closed by the said clutch means in the "out" position, and means whereby an electric circuit is formed through both said switch means by energization of one of the said electromagnets, the master switch when closed, and the said solenoids, so that the latter will shift one of the said gear control members into a gear speed position, and means operable automatically through the preceeding movement of the said gear control member to break the circuit through the said energized electromagnet, and close the circuit through another said electromagnet when the master switch is again closed, to shift the said gear control member into neutral gear position, and means operable automatically through the last mentioned electromagnet and the said solenoids to shift the other said gear control member into another gear speed position, and interlocking switch means controlling the said shifting means, operable automatically to assure shifting of the first mentioned gear control member into neutral gear position before the said shifting means imparts movement to the second mentioned gear control member.

17. In a change speed mechanism as described in claim 12, with two parallel gear control members, each movable in opposite directions, having interlocking switch means, operable automatically to prevent simultaneous operation of both said gear control members, coacting with the said contact switch assembly means to assure shifting of both gear control members to neutral gear position before the said shifting means imparts movement to either gear control member into another gear speed position.

18. In a change speed mechanism as described in claim 10, having electric pilot light means including a pilot light constructed and visible within the said momentary contact switch means of each gear speed and neutral gear position, each said pilot light coacting with its associated momentary contact switch means and electromagnet, and operable automatically to visibly indicate each preselected gear speed or neutral gear position.

EDWIN F. WHEELER.